G. W. HAHN.
HORSE COLLAR AND HAMES.
APPLICATION FILED MAY 5, 1916.
1,254,324.
Patented Jan. 22, 1918.
2 SHEETS—SHEET 2.
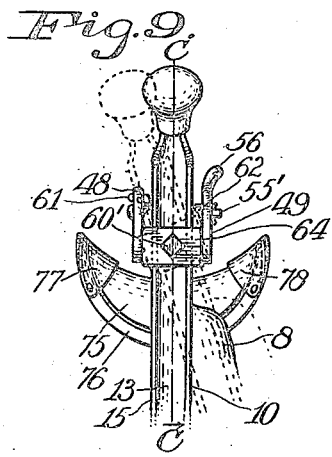
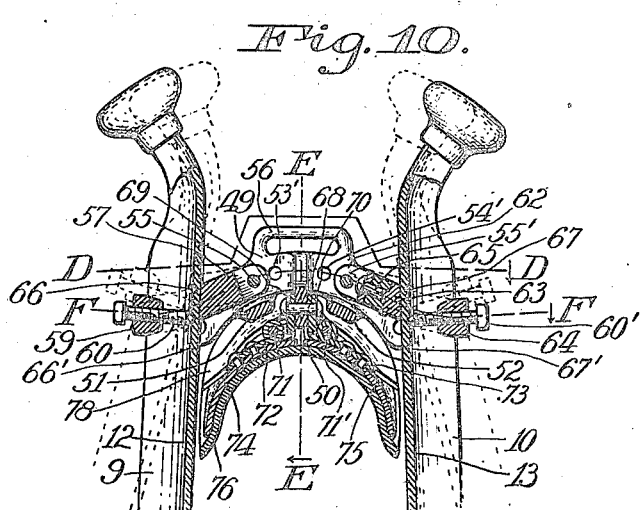
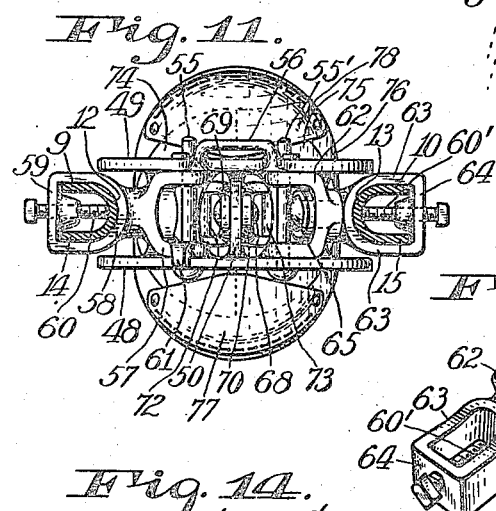
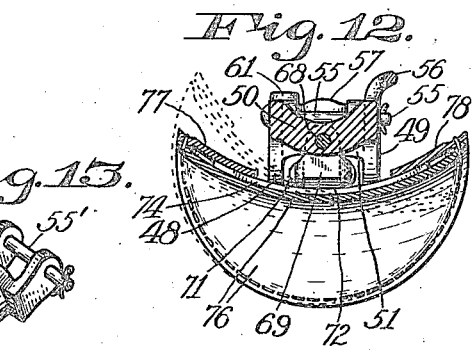
WITNESSES:
J. H. Gardner.
M. E. Sparrow.
INVENTOR:
George W. Hahn,
BY
E. T. Silvius,
ATTORNEY.

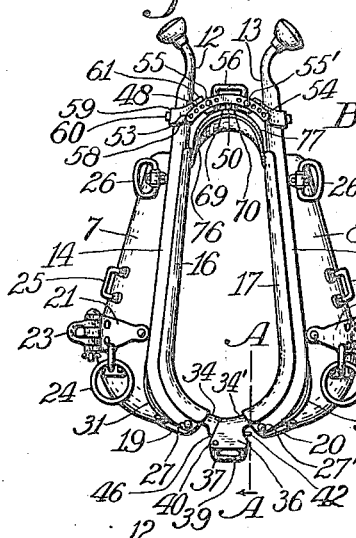

UNITED STATES PATENT OFFICE.

GEORGE W. HAHN, OF INDIANAPOLIS, INDIANA.

HORSE-COLLAR AND HAMES.

1,254,324.

Specification of Letters Patent.

Patented Jan. 22, 1918.

Application filed May 5, 1916. Serial No. 95,576.

*To all whom it may concern:*

Be it known that I, GEORGE W. HAHN, a citizen of the United States, residing at Indianapolis, in the county of Marion and State of Indiana, have invented a new and useful Horse-Collar and Hames, of which the following is a specification, reference being had to the accompanying drawings and to the letters and figures of reference marked thereon.

This invention relates to a combined collar and hames for draft animals, the invention having reference more particularly to the type of collar and hames that is composed of two principal parts or halves adjustably connected together.

An object of the invention is to provide an improved collar and hames combined which shall be so constructed as to be adapted to be quickly placed on an animal and adjusted so as to be comfortably worn by the animal whether of large or relatively small size. Another object is to provide improvements in the construction of the hames and means for adjustably and detachably connecting the normal lower ends thereof together and so as to be of inexpensive construction and strong, reliable and durable in use. A further object is to provide improved hame construction and means for adjustably and hingedly connecting the normal upper portions of the hames together, and which shall be of simple and inexpensive but strong and reliable construction. A still further object is to provide an improved neck-pad and means for connecting it to the hames structure so as to support the collar and hames comfortably on the neck of the animal.

With the above-mentioned and other objects in view, the invention consists in a collar and hames combined having improved features of construction whereby the above-mentioned and other objects are attained; and, the invention consists further in the novel parts, and in the combinations and arrangements of parts, as hereinafter particularly described and further defined in the accompanying claims.

Referring to the drawings, Figure 1 is a front elevation of the improved collar and hames; Fig. 2 is a bottom plan view showing the appliances whereby the lower ends of the hames are connected together; Fig. 3 is a fragmentary section on the line A A on Fig. 1; Fig. 4 is a perspective view of one of the improved devices for connecting the lower ends of the hames together; Fig. 5 is a fragmentary section of the collar and hames on the line B B on Fig. 2; Fig. 6 is a perspective view of a connecting device designed to coöperate with that shown in Fig. 4; Fig. 7 is a fragmentary section similar to Fig. 5 but with the connecting devices in relatively different arrangement, the pad portion of the collar being omitted; Fig. 8 is an end view of the device shown in Fig. 6; Fig. 9 is a fragmentary side elevation showing the upper portion of the improved collar and hames; Fig. 10 is a section approximately on the line C C on Fig. 9; Fig. 11 is a sectional plan approximately on the line D D on Fig. 10; Fig. 12 is a section of the neck-pad and parts with which it is connected approximately on the line E E on Fig. 10; Fig. 13 is a perspective view of an improved connecting device with which one of the hames is provided; Fig. 14 is a section showing the several assembled connecting devices approximately on the line F F on Fig. 10; and, Fig. 15 is a perspective view of the improved main member whereby the upper portions of the hames are connected together and to the improved neck-pad.

Similar reference characters throughout the various figures of the drawings indicate corresponding elements or features of construction herein referred to.

In the construction the collar includes two pads of well-known or suitable form to approximately fit to the shoulders of the animal, one pad consisting of a flexible back portion 1 and a flexible front portion 2 secured together with suitable stuffing 3 between the two portions, the companion pad being composed of a flexible back portion 4 and a flexible front portion 5 connected together and inclosing suitable stuffing 6. The collar includes also two front plates 7 and 8 composed of sheet metal and pressed to suitable shape to conform to the proper contour of the front of the two pads which are suitably secured to the backs of the plates respectively, so that the plates constitute parts of the hames. Two separate hame members are provided which are composed of metal and shaped so as to conform to the required contour of a collar of the above-mentioned character. Each hame part is approximately U-shape in cross-section, each hame part having a wing member 9 arranged on the front of the plate 7, the other having a wing member 10 arranged on the front of the plate 8, the wings being secured to the respective plates by means of rivets 11, 11'. The member 9 has an inner wall portion 12 thereon, the member 10 having an inner wall portion 13 thereon, both being convex transversely so as to present rounded faces toward the neck of the animal, the wall portions having front wing members 14 and 15 thereon respectively. Leather linings 16 and 17 are secured to the inner portions 12 and 13 respectively by means of rivets 18 and 18' respectively, the linings being connected to the adjacent portions of the pads and extending downward to the lower ends of the hame parts, the hame parts extending upward and downward beyond the front plates 7 and 8 respectively, and flexible protecting aprons 19 and 20 are connected to the linings and to the front plates and extend behind the projecting portions of the metallic hame parts. Draft-plates 21 and 22 are rigidly secured to the front plates 7 and 8 respectively and are provided with hinged loops 23 and 23' and also rings 24 and 24' for well-known purposes, the front plates having also loops 25 and 25' thereon to which harness straps may be connected, the upper portions of the front plates having rings 26 and 26' thereon for guiding bridle reins.

The normal lower portions of the hame parts are provided with hinge-pins 27 and 27' respectively that are connected to the wings of the parts at a suitable distance from the inner walls 12 and 13 respectively. Two lock levers 28 and 28' are provided which are alike in form and have hinge members 29 and 29' thereon respectively that are connected to the hinge-pins 27 and 27' respectively. The lock levers have projections 30 and 30' thereon respectively that normally extend toward the inner wall portions 12 and 13 respectively of the hame parts and may be held in normal position by various means, preferably by means of elastic arms 31 and 31' that are secured to the lock levers respectively and extend upwardly so as to be forced between the wings of the hames, the arms having outwardly curved end portions 32 and 32' which are normally engaged by links 33 and 33' swingingly mounted on the wall portions 12 and 13 respectively, the links holding the arms under tension. Two-coupling bars 34 and 34' are provided which are inserted between the hinge members 29 and 29' respectively and the opposite walls 12 and 13 respectively, one coupling-bar having sockets 35 therein to receive the projection 30, the other having similar sockets 35' therein to receive the projection 30'. When the projection of the lock bar is swung into a socket and the elastic arm brought under tension and secured in place the coupling-bar is securely clamped in the hame part, being forced against the inner wall thereof. One coupling-bar has a latch-box thereon which comprises two downwardly-projecting side plates 36 and 37 to which a bridge 38 is connected, the rearward one of the plates having an eye 39 with which to connect a harness strap for holding the collar back to the shoulders of the animal. A pivot 40 is connected to the two side plates and supports a latch-bar 41 that normally extends into the coupling-bar which is suitably recessed to receive a portion of the companion coupling-bar. The latch-bar has a finger 42 for retracting it against the pressure of a spring arm 43 engaging the outer side of the latch-bar and supported by a spring arm 44 engaging the bridge 38. The coupling-bar 34 has a head portion 45 that projects from a shoulder 46 formed on the coupling-bar to engage the front of the latch-box, the end of the head having a lug 47 therein to be engaged by the end of the latch-bar 41 which is received into a suitable recess formed in the head portion 45. When the arms 31 and 31' are released and swung out of the channels that are provided in the outer sides of the hame parts the coupling-bars are released and may be moved longitudinally in the channels in which they are arranged, the movement being permissible when the coupling-bars are connected together. The elastic arms insure tight clamping of the coupling-bars in the channels, although the various parts may vary slightly in dimensions, not being machined or fitted with great accuracy. Thus the coupling-bars become relatively rigid extensions of the respective hame parts.

An improved yoke is provided which is advantageously connected directly to the hames above the collar pad, the yoke having an arched main part comprising curved members 48 and 49 fixed to a center bar 50 and transverse bars 51 and 52. The curved members have pin-holes 53 and 53' respectively on one side of the center bar and similar pin-holes 54 and 54' on the opposite side of the center bar to receive hinge-pins 55 and 55' respectively, one on either side of the center bar. The top of the rearward member 49 is provided with an eye 56 to which a part of the harness may be connected. A hinge member 57 is connected to one of the hinge-pins and has a clamp head thereon comprising a main portion 58 and a front bar 59, the head being open to receive one of the hame parts, the front bar having a set-screw 60 inserted therein so as to extend into the channel of the hame part and engage and force the inner wall portion 12 tightly against the inner side of the opening in the head, the clamp head being adjustable upward or downward relatively to the hame part. The hinge member 57 has a stop device 61 fixed thereon that extends over the top of the member 48 to limit the pivotal movement of the hinge member. A hinge member 62 is connected to the other one of the hinge-pins to swing thereon, another clamp head is provided which comprises a main portion 63 and a front bar 64, a set-screw 60' being inserted in the front bar for likewise securing the other one of the hame parts in the clamp head, and the clamp head is provided with a trunnion 65 that is rotatably connected to the hinge member 62. The hames, as will be seen, may be swung on the hinge-pins 55 and 55' and one of the hames may swing also on the axis of the trunnion which is at right angles to the axis of the hinge-pin 55' to permit the collar and hames when connected to a harness to be easily placed upon or removed from the neck of the animal. Preferably the wall portion 12 has a number of sockets 66 and 66' suitably spaced apart to receive the point of the set-screw 60 so as to determine the extent of adjustment of the yoke on the hames, the wall portion 13 of the other hame part having similar sockets 67 and 67' to receive the point of the set-screw 60.

An improved neck-pad is provided which is automatically adjustable to the neck of the animal relatively to the collar and hames, and also adjustable to conform to different necks that may be different in thickness. In order to connect the neck pad to the yoke the center bar 50 is provided with a pivot 68 whereby two ears 69 and 70 are pivotally connected to the center bar on opposite sides thereof, and the ears are provided respectively with hinge-pins 71 and 71' whereby hinge members 72 and 73 are hingedly connected to the ears respectively. A suitable curved metallic frame member 74 is secured to the hinge member 72, and an oppositely curved frame member 75 is secured to the hinge member 73. The frame members together constitute a saddle base that is adapted to conform to various shapes of necks and is provided with a pad 76 composed of leather or other suitable material and arranged under the frame members and connected thereto by means of clips 77 and 78, preferably composed of leather and secured to the forward and rearward end portions respectively of the pad and extending over the adjacent portions of the frame members so as to permit slight adjusting movement of the frame members relatively to the pad.

In practical use the neck pad is self-adjusting upon the neck of the animal and supports the yoke which supports the hames and the collar, as is usual. In case the upper portions of the hames require re-adjustment this is readily accomplished by simply shifting the hinge-pins 55 and 55' to other pairs of pin-holes in the main member of the yoke to bring the hame parts the required distance apart. If the hames and collar need re-adjusting as to height the set-screws 60 and 60' are slackened and moved to other sockets in the wall portions of the hame parts and again tightened. If the lower portion of the collar and hames must be readjusted it is only necessary to release the arms 31 and 31' of the lock levers and swing the arms outward as indicated by broken lines on Fig. 5 to release the coupling-bars which may then be quickly adjusted as may be desired, after which the arms are swung back to normal position and fastened by the links 33 and 33' respectively. In order to remove the collar and hames from the animal the latch-bar 41 is retracted to release the head portion 45, after which the hames may be swung apart on the hinge-pins 55 and 55', as indicated by broken lines on Fig. 10, so as to permit free movement of the hame parts, and if desired one of the hame parts may be swung forward or rearward as indicated by broken lines on Fig. 9.

Having thus described the invention, what is claimed as new is—

1. A horse-collar and hames including two hame parts having each a lock lever pivotally connected therewith, each lock lever being provided with a controlling arm, two coupling-bars inserted in the hame parts respectively and secured thereto by the lock levers respectively, and means for stationarily securing the controlling arms to the respective hame parts.

2. A horse-collar and hames comprising a neck-pad having two frame members each provided with a hinged ear, a main yoke member pivoted to the two ears, a pad loosely connected to the two frame members, clamp heads mounted on the yoke members, and two hame parts secured in the clamp heads respectively and detachably connected together at their lower ends.

3. A horse-collar and hames comprising two hame parts hingedly connected together adjacent to their upper ends and having each a longitudinal channel in its outer side, two lock levers arranged in the channels and pivotally connected to the hame parts respectively, each lock lever being provided with a controlling arm to swing into or out of the channel, two interconnectible coupling-bars adjustably arranged in the channels of the hame parts and secured therein by the lock levers respectively, and fasteners coöperating with the hame parts for holding the controlling arms respectively when in the channels.

4. A horse-collar and hames comprising two hame parts oppositely arranged, two pads arranged on the backs of the hame parts respectively, connecting means applied to the upper portions of the hame parts, two coupling-bars secured to the lower portions of the hame parts respectively, one of the coupling-bars being detachably connected to the other and having an eye on its rear portion to receive a hold-back strap, and two tug devices operatively connected to the two hame parts respectively.

5. A horse-collar and hames comprising two hame parts oppositely arranged and having each a longitudinal channel in its outer side, the lower end of each part being provided with a coupling-bar, the coupling-bars being inter-connecting, and a yoke having two clamp heads provided with openings receiving the hame parts respectively, one of the heads having pivotal and swivel connections with the yoke, and each head being provided with a movable securing device extending into the channel and seated on the bottom of the channel of the part to secure the hame part to the head.

6. A horse-collar and hames comprising two hame parts oppositely arranged and having each a longitudinal channel in its outer side, the channel of each hame part having a lock lever and also a link therein and hinged to the part, each lock lever being provided with a laterally-elastic arm that is normally engaged by the link that is in the channel with the lock lever, and two coupling-bars detachably connected together and adjustably secured in the channels of the hame parts by the lock levers therein respectively.

7. A horse-collar and hames comprising two metallic front plates, two pads arranged on the backs of the front plates respectively, two metallic hame parts to be connected together at their lower ends, each hame part having two wings and an inner wall connected to the wings, one wing of one of the parts being secured to the front of one of the front plates, one wing of the other one of the parts being secured to the front of the remaining one of the front plates, the hame parts having straight portions extending straight upward beyond the upper ends of the front plates respectively, and hinging and swiveling connecting means having heads rigidly secured to the straight portions of the hame parts respectively.

8. A horse-collar and hames comprising two metallic front plates, two pads arranged on the backs of the front plates respectively, two metallic hame parts having wing members secured to the fronts of the front plates respectively and having also inner wall portions extending from the wing members and front wings extending from the wall portions respectively, two linings secured to the outer faces of the wall portions and connected to the pads respectively, two coupling-bars detachably connected together and adjustably arranged on the outside of the wall portions respectively of the hame parts, lock levers for the coupling-bars and pivoted to the wing members respectively and having each an operating arm, and connecting means applied to the upper portions of the hame parts.

9. In a horse-collar and hames appliance, a plurality of inter-connectible coupling-bars having each a plurality of separate sockets in one side thereof, each socket being walled on all sides thereof, in combination with a plurality of hame parts having each an opening to receive one of the coupling-bars and provided with a pivoted latch device adapted to be entered into either one of the sockets of the coupling-bar, the latch device having a long operating arm.

10. In a horse-collar and hames appliance, the combination of a pair of hame parts, a yoke comprising a main part, the top of the rearward portion of the main part having an eye thereon, two hinge members hingedly connected to the main part and having each a clamp head thereon, one of the hinge members having a stop device on its upper portion adapted to contact with the top of the forward portion of the main part, said clamp heads having each an opening therein receiving one of the hame parts, and set-screws in the clamp heads engaging the hame parts.

11. In a horse-collar and hames appliance, the combination of two hame parts oppositely arranged and having each a longitudinally-extending channel in the outer side thereof, two lock levers arranged in the channels of the hame parts respectively and pivotally connected to the parts, each lock lever having a projection thereon and having also a controlling lever to swing into or out of the channel, two coupling-bars to be detachably connected together and being adjustably arranged in the channels of the hame parts respectively, each coupling-bar having sockets to receive the projection of the lock lever, and two latch devices arranged in the channels of the hame parts respectively and movably connected with the parts to engage and hold the controlling arms in the channels.

12. In a horse-collar and hames appliance, the combination of a pair of hame parts oppositely arranged and having each a longitudinally-extending channel in the outer side thereof, each channel having a lock lever pivoted therein and also a catch device in the channel movably connected to the hame part, each lock lever having a controlling arm secured thereto to be engaged when in the channel by the catch device, a pair of inter-connectible coupling bars insertible in the channels of the hame parts to be forcibly engaged by the lock levers, one of the coupling-bars having a latch-box thereon provided with an eye on its rear portion to be connected with a harness strap, the remaining one of the coupling-bars being insertible into the latch-box, and a latch in the latch-box to engage said remaining one of the coupling-bars.

13. In a horse-collar and hames appliance, the combination with two hame parts, of a yoke connected to the hame parts and having a pivot, two ears connected to the pivot and provided with hinge-pins respectively, two hinge members connected to the hinge-pins respectively, two frame members fixedly secured to the hinge members respectively, a flexible pad arranged under the two frame members, and two clips secured to the top of the pad and extending partially over the opposite end portions respectively of the two frame members to loosely fasten the pad to the members and permit relative movement thereof.

14. In a horse-collar and hames appliance, the combination with two hame parts, of a yoke comprising a main part having two hinge-pins adjustably connected thereto, a hinge member connected to one of the hinge-pins and having a clamp head fixed thereon and having also a stop device thereon adapted to contact with the said main part to limit the movement of the hinge member about the hinge-pin, and a hinge member connected to the other one of the hinge-pins and having a clamp head swiveled thereto, said clamp heads being rigidly secured to the hame parts respectively.

15. In a horse-collar and hames appliance, a pair of hame parts oppositely arranged and having each a longitudinally-extending channel in the outer side thereof, each channel having a lock lever pivoted therein and also a catch device supported in the channel to move toward or from the lever, each lever being provided with a laterally-elastic arm to be engaged when in normal position by the catch device, in combination with a pair of inter-connectible coupling-bars insertible in the channels respectively and adapted to be forcibly engaged by the lock levers to secure the coupling-bars to the hame parts respectively.

In testimony whereof, I affix my signature in presence of two witnesses.

GEORGE W. HAHN.

Witnesses:
  E. T. SILVIUS,
  J. H. GARDNER.

Copies of this patent may be obtained for five cents each, by addressing the "Commissioner of Patents, Washington, D. C."